US010210179B2

(12) United States Patent
van Zwol et al.

(10) Patent No.: US 10,210,179 B2
(45) Date of Patent: Feb. 19, 2019

(54) DYNAMIC FEATURE WEIGHTING

(75) Inventors: Roelof van Zwol, Badalona (ES);
Reinier H. van Leuken, Utrecht (NL)

(73) Assignee: EXCALIBUR IP, LLC, New York, NY (US)

( * ) Notice: Subject to any disclaimer, the term of this patent is extended or adjusted under 35 U.S.C. 154(b) by 1287 days.

(21) Appl. No.: 12/273,197

(22) Filed: Nov. 18, 2008

(65) Prior Publication Data
US 2010/0125568 A1 May 20, 2010

(51) Int. Cl.
*G06F 17/30* (2006.01)
*G06K 9/46* (2006.01)

(52) U.S. Cl.
CPC ......... *G06F 17/30247* (2013.01); *G06K 9/46* (2013.01)

(58) Field of Classification Search
CPC ......... G06F 17/30017; G06F 17/30244; G06F 17/30247; G06F 17/30256; G06F 17/30867; G06F 17/30265; G06F 17/3053; G06F 17/30274; G06F 17/30864; G06F 17/30038; G06F 17/30386; G06F 17/30876; G06F 17/30047; G06F 17/30648; G06F 17/30699; G06F 17/30477; G06F 17/30528; G06F 17/30554
USPC .......... 707/723, 765, 769, 999.001, 999.003
See application file for complete search history.

(56) References Cited

U.S. PATENT DOCUMENTS

| | | | | |
|---|---|---|---|---|
| 5,638,465 A * | 6/1997 | Sano | .................... | G06K 9/6228 382/159 |
| 5,828,771 A * | 10/1998 | Bloomberg | ............ | G06K 9/036 382/112 |
| 6,397,213 B1 * | 5/2002 | Cullen | .............. | G06F 17/30017 707/999.005 |
| 6,463,426 B1 * | 10/2002 | Lipson | .............. | G06F 17/30247 707/999.003 |
| 7,587,085 B2 * | 9/2009 | Steinberg | ............. | G06K 9/0061 382/117 |
| 7,852,202 B2 * | 12/2010 | Miake | .................... | G09G 5/363 340/459 |
| 8,023,708 B2 * | 9/2011 | Dewaele | .............. | G06K 9/4671 382/128 |
| 8,160,309 B1 * | 4/2012 | Tzur | ...................... | H03F 3/217 382/118 |
| 8,463,053 B1 * | 6/2013 | Guo | ........................ | G06F 17/10 382/225 |
| 8,553,037 B2 * | 10/2013 | Smith | .................... | G06T 13/40 345/473 |

(Continued)

OTHER PUBLICATIONS

Lew et al., *Content-based Multimedia Information Retrieval: State of the Art and Challenges*, ACM Transactions on Multimedia Computing, Communications, and Applications, pp. 1-19, (2006).

*Primary Examiner* — Ashish Thomas
*Assistant Examiner* — Rezwanul Mahmood
(74) *Attorney, Agent, or Firm* — James J. DeCarlo; Greenberg Traurig, LLP

(57) ABSTRACT

This disclosure describes systems and methods for identifying and ranking relevant and diverse image search results in response to a query. An optimum set of features is identified for every query. The optimum set of features can be selected from a predefined set of features and can be selected based on a variance across features derived from an initial set of objects returned in response to the query. The optimum set of features can then be used to re-rank the initial set of objects or to search for a second set of objects and rank the second set of objects.

13 Claims, 3 Drawing Sheets

(56) References Cited

U.S. PATENT DOCUMENTS

| | | | |
|---|---|---|---|
| 2001/0046330 A1* | 11/2001 | Shaffer | G06F 17/30256 382/284 |
| 2001/0056415 A1* | 12/2001 | Zhu | G06F 17/30256 707/999.001 |
| 2002/0002550 A1* | 1/2002 | Berman | G06F 17/30247 707/999.003 |
| 2002/0099721 A1* | 7/2002 | Ganapathy | G06F 17/3025 707/999.104 |
| 2002/0164075 A1* | 11/2002 | Acharya | G06F 17/30256 382/190 |
| 2003/0044062 A1* | 3/2003 | Ganapathy | G06F 17/3025 382/165 |
| 2003/0048950 A1* | 3/2003 | Savakis | G06F 17/30247 382/225 |
| 2003/0088387 A1* | 5/2003 | Chang | G06F 17/30259 702/196 |
| 2003/0123737 A1* | 7/2003 | Mojsilovic | G06F 17/30247 382/224 |
| 2003/0128874 A1* | 7/2003 | Fan | G06K 9/00456 382/170 |
| 2003/0187836 A1* | 10/2003 | Ikeda | G06F 17/30247 707/999.003 |
| 2003/0195883 A1* | 10/2003 | Mojsilovic | G06F 17/30256 707/999.006 |
| 2003/0215119 A1* | 11/2003 | Uppaluri | G06F 19/321 382/128 |
| 2003/0215120 A1* | 11/2003 | Uppaluri | A61B 6/482 382/128 |
| 2005/0018904 A1* | 1/2005 | Davis | G06K 9/6206 382/181 |
| 2005/0165763 A1* | 7/2005 | Li | G06F 17/30247 707/999.003 |
| 2005/0212821 A1* | 9/2005 | Xu | G06T 11/00 345/647 |
| 2005/0262067 A1* | 11/2005 | Lee | G06F 17/30017 707/999.003 |
| 2006/0010126 A1* | 1/2006 | Anick | G06F 17/30646 707/999.004 |
| 2006/0050993 A1* | 3/2006 | Stentiford | G06F 17/30265 382/305 |
| 2006/0112092 A1* | 5/2006 | Ziou | G06F 17/30274 707/999.005 |
| 2006/0251339 A1* | 11/2006 | Gokturk | G06F 17/30253 382/305 |
| 2006/0280427 A1* | 12/2006 | Snowdon | H04N 1/00132 386/223 |
| 2007/0070365 A1* | 3/2007 | Boregowda | G06F 17/3025 358/1.9 |
| 2007/0143272 A1* | 6/2007 | Kobayashi | G06F 17/30247 707/999.003 |
| 2007/0174269 A1* | 7/2007 | Jing | G06F 17/30265 707/999.005 |
| 2007/0296824 A1* | 12/2007 | Paine | G06T 3/4038 348/222.1 |
| 2008/0037877 A1* | 2/2008 | Jia | G06F 17/30247 382/224 |
| 2008/0082426 A1* | 4/2008 | Gokturk | G06F 17/30256 705/26.62 |
| 2008/0144943 A1* | 6/2008 | Gokturk | G06F 17/3025 382/224 |
| 2008/0152231 A1* | 6/2008 | Gokturk | G06F 17/30256 382/209 |
| 2008/0170761 A1* | 7/2008 | Teng | G06F 17/30256 382/118 |
| 2008/0177640 A1* | 7/2008 | Gokturk | G06Q 30/02 705/26.62 |
| 2008/0212899 A1* | 9/2008 | Gokturk | G06F 17/30259 382/305 |
| 2008/0222113 A1* | 9/2008 | Baba | G06F 17/30247 707/999.003 |
| 2008/0298766 A1* | 12/2008 | Wen | G06F 17/30259 386/282 |
| 2009/0063431 A1* | 3/2009 | Erol | G06F 17/30247 707/999.003 |
| 2009/0067726 A1* | 3/2009 | Erol | G06F 17/30247 382/197 |
| 2009/0070110 A1* | 3/2009 | Erol | G06F 17/30247 704/236 |
| 2009/0070415 A1* | 3/2009 | Kishi | G06F 17/30247 709/203 |
| 2009/0074300 A1* | 3/2009 | Hull | G06F 17/30247 382/209 |
| 2009/0074306 A1* | 3/2009 | Liu | G06F 17/30247 382/229 |
| 2009/0097756 A1* | 4/2009 | Kato | G06F 17/30256 382/190 |
| 2009/0112830 A1* | 4/2009 | Denoue | G06F 17/30265 707/999.004 |
| 2009/0125487 A1* | 5/2009 | Rossi | G06F 17/30247 707/999.003 |
| 2009/0257682 A1* | 10/2009 | Wang | G06K 9/3208 382/289 |
| 2009/0324026 A1* | 12/2009 | Kletter | G06K 9/00442 382/124 |
| 2010/0046842 A1* | 2/2010 | Conwell | G06F 17/30265 382/218 |
| 2010/0077289 A1* | 3/2010 | Das | G06F 17/30265 715/230 |
| 2010/0082607 A1* | 4/2010 | Punera | G06F 17/30713 707/723 |
| 2010/0082614 A1* | 4/2010 | Yang et al. | 707/726 |
| 2010/0114933 A1* | 5/2010 | Murdock | G06F 17/30265 707/765 |
| 2010/0119152 A1* | 5/2010 | Lv | G06K 9/00751 382/190 |
| 2010/0121846 A1* | 5/2010 | Habets | G06F 17/30265 707/728 |
| 2010/0125568 A1* | 5/2010 | van Zwol | G06F 17/30247 707/722 |
| 2010/0131499 A1* | 5/2010 | van Leuken et al. | 707/723 |
| 2010/0131500 A1* | 5/2010 | van Leuken | G06K 9/622 707/723 |
| 2010/0185624 A1* | 7/2010 | Wang | G06F 17/3025 707/748 |
| 2011/0010319 A1* | 1/2011 | Harada | G06F 17/30265 706/12 |
| 2011/0081090 A1* | 4/2011 | Bouguet | G06F 17/30256 382/224 |
| 2011/0142301 A1* | 6/2011 | Boroczky | G06T 7/0012 382/128 |
| 2012/0166435 A1* | 6/2012 | Graham | G06F 17/30017 707/728 |

* cited by examiner

DYNAMIC FEATURE WEIGHTING

BACKGROUND

When a user searches for images on a network such as the Internet the user initiates a query for images, often via textual input (e.g., typing the keywords "Porsche 911"). In response to the query, a search is performed, and images similar to the query are returned as a set of image search results (also known as results or query results). Traditionally image search results are found and ranked based upon matching the keywords with text associated with images (e.g., the HTML code, text adjacent to the image on a web page, image captions, etc.) on a network or images on a network that have been indexed. However, such methods are limited. For instance, synonyms may not be captured by such a search. Images appearing without text, such as automatically generated security camera images, may not be found in a search. Hence, in terms of relevance and diversity, queries that match text can only go so far.

Some methods try to overcome these limitations by extracting a predefined set of features from images (e.g., color, texture, edge, shape, etc.) and comparing these features to the user's textual query or keywords or to images selected by the user. In this way, the images themselves rather than just text associated with the images are analyzed. Content Based Image Retrieval (CBIR) is one example of such image analysis. CBIR is also known as query by image content (QBIC) and content-based visual information retrieval (CBVIR). These methods entail extracting content, data, or features (e.g., color, edge, texture) from images and using them to rank those images relative to a query. For example, color can be extracted for each image by plotting a histogram of the number of pixels of ranges of colors. As another example, texture can be extracted via identifying patterns of pixels within an image and comparing these to patterns in other images. Another example is shape, where edge detection identifies shapes within an image and compares these to identified shapes within other images.

For further information regarding the state of the art see, *Content-based Multimedia Information Retrieval State of the Art and Challenges* Michael Lew et al., ACM Transactions on Multimedia Computing, Communications, and Applications, pp. 1-19, 2006.

SUMMARY

This disclosure describes systems and methods for dynamically identifying and ranking relevant and diverse image search results that are optimized for any given query. In an aspect of the disclosure a method is described comprising the following steps: receiving an initial set of images related to a query via a network, the initial set of images being ranked based on a first determination of at least relevance to the query; selecting a plurality of highest ranked images from the initial set of images to form a subset of selected images; identifying an optimum set of features from the subset based on characteristics of the subset; using the optimum set of features to re-rank the initial set of images according to a second determination of relevance to the query, the second determination being optimized to enhance relevance and diversity relative to the first determination; and returning the re-ranked images in response to the query.

In another aspect of the disclosure the characteristics of the subset include a variance for each feature across the subset of selected images. In another aspect of the disclosure the step of using the features includes weighting the features based on the variance for each feature across the subset of selected images. In another aspect of the disclosure greater weight is assigned to features having greater variance. In another aspect of the disclosure greater weight is assigned to features having lower variance. In another aspect of the disclosure the images are ranked based on a first determination of diversity. In another aspect of the disclosure the re-ranked images are more relevant to the query than, and more diverse than the initial set of images ranked via the first determination. In another aspect of the disclosure the second relevance of each image to the query is determined via the following equation:

$$d(a, b) = \frac{1}{n}\sum_{i=o}^{n} \frac{1}{var_i} d_i(a, b)$$

where a is a vector representing the query; where b is a vector representing any image in the subset of selected images; where n is the number of features; where i is a range of integers, each representing one of the $1^{st}$ through $n^{th}$ features; where d(a,b) is a distance between vectors a and b; where $d_i(a,b)$ is the distance between vectors a and b for a given feature i; and where $var_i$ is the variance of feature i in the subset of selected images. In another aspect of the disclosure the query is text. In another aspect of the disclosure the query is an image. In another aspect of the disclosure re-ranking the set of images includes performing a second query using the optimum set of features. In another aspect of the disclosure features include at least one or more of the following: a color layout, a color histogram, scalable color, an edge histogram, an edge directivity descriptor, and tamura. In another aspect of the disclosure features include non-visual features. In another aspect of the disclosure non-visual features can be extracted from text associated with an image, image metadata, image spatial information, query spatial information, image temporal information, query temporal information, social characteristics associated with the image or the user, or a user profile.

Another aspect of the disclosure describes a computer readable media or medium tangibly comprising computer readable instructions for the following: receiving an initial set of images related to a query via a network, the initial set of images being ranked based on a first determination of at least relevance to the query; selecting a plurality of highest ranked images from the initial set of images to form a subset of selected images; identifying an optimum set of features from the subset based on characteristics of the subset; using the optimum set of features to re-rank the initial set of images according to a second determination of relevance to the query, the second determination being optimized to enhance relevance and diversity relative to the first determination; and returning the re-ranked images in response to the query.

Another aspect of the disclosure describes a system comprising the following: a query input; a predefined set of features; an initial set of images accessible via a network and selected for its relevance to the query; and an image matching module having: a receiving initial set of images module; a selecting highest ranked images module that selects a plurality of the highest ranked images from the initial set of images to form a subset of selected images; an identifying optimum set of features module for identifying those features in the predefined set of features that, when used to re-rank the initial set of images, will produce relevant and diverse image search results; a re-ranking initial set of images module that uses the optimum set of features to determine a re-ranking of the initial set of images; and a returning re-ranked images module. In another aspect of the disclosure the system further comprises a re-querying images module for performing a second query for image search results based on the optimum set of features.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

This disclosure describes systems and methods for dynamically identifying and ranking relevant and diverse image search results that are optimized for any given query. Current methods use a predetermined set of features to determine the similarity or relevance between a query and images found on a database or network such as the Internet. However, since some features better distinguish between images than others, a more effective method of matching image search results to a query uses only the most important features or an optimum set of features for each query. In an embodiment, the features in the optimum set of features can be assigned weights such that each feature in the optimum set has a different effect on which images are returned in response to a query and/or how those results are ranked. This disclosure thus allows dynamic determinations of feature weighting and importance using multi-modal systems and methods.

A more detailed look at the systems and methods of the present disclosure begins with a query for images such as a text/keyword input (e.g., "Porsche 911"). A query is then performed that searches for and identifies image search results related to the query input. These image search results, called an initial set of images, are ranked in terms of relevance to the query input and returned to the query requestor (e.g., a user's personal computer). The highest ranked image search results can then be selected as a subset of selected images. The initial set of images can be analyzed to determine a feature variance across the subset of selected images. Those features having the greatest variance are selected as members of an optimum set of features. This aspect of the disclosure can be referred to as query dependent feature importance since those features used in the optimum set of features are the most important and their importance is based on the query. The optimum set of features can be used to re-rank the initial set of features or to search for a second set of features and to rank the second set of features. In an embodiment, the features of the optimum set of features can be ranked and/or weighted in terms of variance across the subset of selected images. Those optimum features having the greatest variance will be associated with the highest rank or the greatest weight. When the optimum set of features is used to re-rank the initial set of images or to perform a second query, the features having greater weight will have a greater influence on the outcome of re-ranking the initial set of images or on the results of a second query. Since multiple features are used simultaneously to re-rank or re-query, the disclosed systems and methods can be referred to as multi-modal ranking.

Figure 1:
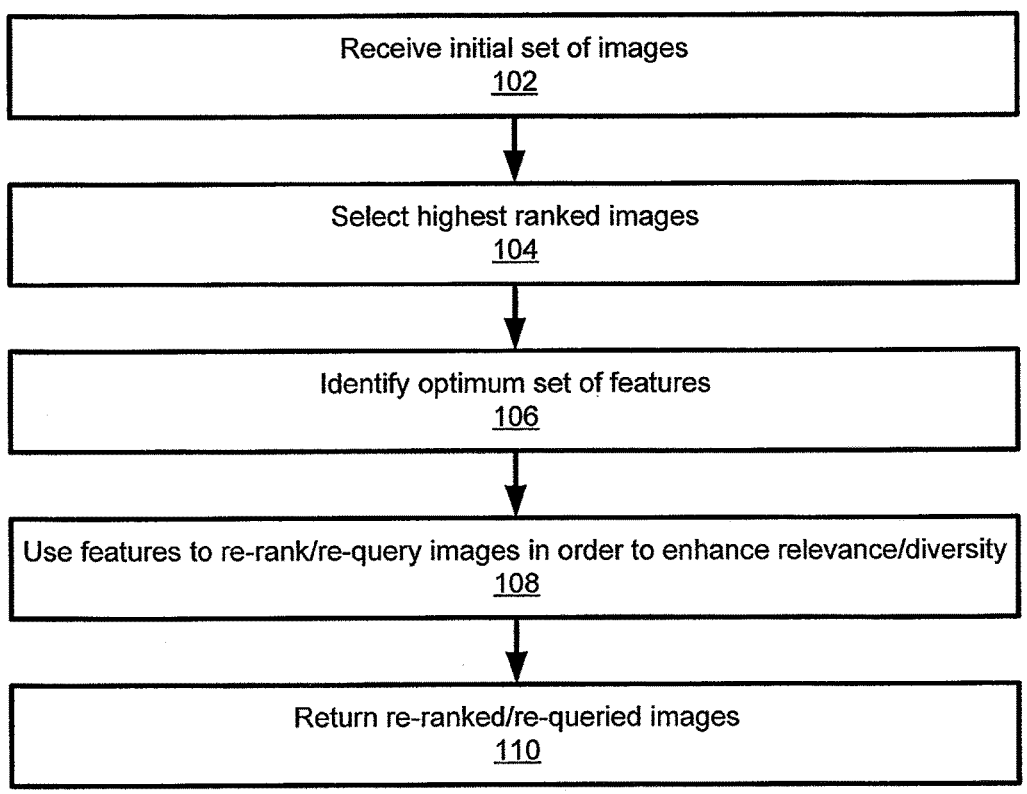
FIG. 1 illustrates one embodiment of a method of re-ranking or re-querying images search results using an optimum set of features.

FIG. 1 illustrates one embodiment of a method of re-ranking or re-querying images search results using an optimum set of features. The method 100 can include a receive initial set of images operation 102, wherein an initial set of images is received relating to a query. Receiving the initial set of images related to a query means receiving digital copies of images or receiving links to images, wherein the images are selected based on relevance to the query or based on relevance and diversity relative to the query. In an embodiment, the initial set of images can be received via a network. Digital copies can be stored on a computer readable medium, server, web server, or computing system, and accessed by a user, user's computing system, or any other computing system. Links to images, or hyperlinks, are elements of a user interface that when selected direct a computing system to access a document or file on that computing system or another computing system. For the purposes of this disclosure, links enable remote access to image documents or files. The digital copies of or links to images will hereinafter be referred to as an initial set of images, and be inclusive of one or more images.

In an embodiment, querying involves searching a network (e.g., the Internet or an intranet) for documents or files similar to or relevant to the query. A query can be based on text (e.g., "Porsche 911" or "soccer pitch") or an image. For example, a user may select a reference image from a computer's memory or from a webpage. This image can be used as the query input, and the query can search for images matching or similar to this reference image. Thus, query inputs can include text and/or images. Users or automated computer systems can initiate queries and enter query inputs.

In an embodiment, the initial set of images can be ranked based on a first determination of at least relevance to the query. Such ranking can be performed via standard methods as seen, for instance, in the GOOGLE or YAHOO! search engines. In an embodiment, ranking can be performed by determining relevance of images to the query based on analysis of images using the predefined set of features. This ranking can be based on a first determination, wherein the first determination is based on relevance to the query. In an alternative embodiment, the first determination can also be based upon diversity. Relevance refers to an estimation that a particular query result will be of interest to the user. Relevance can be determined via a variety of standard methods. For instance, relevance can be based on the number and quality of hyperlinks between a particular web page, website or domain, and other web pages, websites or domains. Other definitions and means of determining relevance are also possible.

Diversity, on the other hand, relates to differences between the images returned in the initial set of images. The value of diversity arises from the fact that users sometimes cannot spell out exactly what they are looking for in a query. Traditional methods return image search results lacking diversity, and thus also lacking images that the user was looking for. Diversity, or an increased variety of images, increases the probability that at least one image will be of interest to the user. For instance, a user may enter a query such as "Porsche 911". Traditional image search methods would likely return images of the exterior of a Porsche 911. However, the user may have been interested only in interior pictures of the Porsche 911 and simply did not know how to articulate this query. As such, more useful search results (e.g., more diverse) would include pictures of Porsche 911 engines, interiors, wheels, undercarriage, etc. A more diversified set of images may be more likely to include an image that the user was interest in (the interior view). As such, diverse image search results are more useful to a user.

The search for and ranking of the initial set of images received in the receiving operation 102 can use a predefined set of features to compare a query to images in order to determine relevance and return relevant search results.

The method 100 further includes a selecting highest ranked images operation 104. This operation 104 entails selecting a plurality of highest ranked images from the initial set of images to form a subset of selected images. The subset of selected images can include all images from the initial set of images or less than all images from the initial set. As noted, the initial set of images returned from a query can be ranked based on relevance to the query. From this ranking, the selecting operation 104 selects one or more of the highest ranked images. In other embodiments the initial set of images can be selected and ranked using means other than those involving features. For instance, the initial set of images can be selected and ranked via textual analysis means known in the art.

Given this subset, an identifying an optimum set of features operation 106 can determine and select the optimum set of features based on the subset of images. The optimum features are those features best suited for distinguishing between images. This is because, for every query, some features are more useful than others for determining relevance and diversity. For instance, color may be a good distinguishing feature between an image of a sunset (mostly shades of red and orange) and an image of the Finish national flag (blue and white). However, color may not be a good distinguishing feature between a building (gray concrete with reflective windows that appear silver) and a vehicle (silver car). In this situation, texture or edge may be better distinguishing features (the edge of the building tends to be straight with right angles while the car has numerous curves). Thus, the systems and methods herein described select those features best able to distinguish between images—in other words the optimum set of features. For the purposes of this disclosure, "optimum" does not refer to the best, but rather refers to the optimum set of features as compared to the predefined set of features or other combinations or sets of features.

Identifying the optimum set of features based on the subset of selected images can be based on characteristics of the subset. In an embodiment, a characteristic of the subset includes the variance for a feature across the subset of images. This embodiment will be discussed in detail with reference to FIG. 2 below.

Features refers to characteristics, identifiers, or descriptors that can be used to compare multiple images to each other. For instance, features can include color layout, color histogram, scalable color, edge histogram, edge directivity descriptor, and tamura, to name a few. More generally, features can include color, edge, texture, and shape, to name a few. Features also include the data representing that feature in each image, hereinafter referred to as feature data (e.g., color histogram, texture patterns, sets of shapes). In an embodiment, features can be represented by vectors or scalars. Such an embodiment allows features to be compared to each other and to other vectors or scalars. Features from different images can then be compared to each other or to aspects of a query in order to determine the similarity between different images or to determine relevance to a query. For instance, using the color feature, images having similar colors will be deemed similar and images having similar colors to those requested in a query will be deemed relevant to the query. As another example, and using the texture feature, images having similar textures to the textures indicated in a query will be deemed relevant to the query.

It should be noted that this disclosure is not limited to visual features. Features can also be extracted from the following: text associated with an image (e.g., text in the caption associated with an image, text in the code associated with displaying an image, text extracted from the image using optical character recognition), image metadata (e.g., date of creation, file type, file size, creator), image spatial information (e.g., geo-tagging or geographical metadata added to image and video files), query spatial information (e.g., geographical location associated with IP address where the query originated from), image temporal information (e.g., time of image capture, time of image upload to the Internet), query temporal information (e.g., time query was initiated), social characteristics associated with the image or the user, or a user profile (e.g., a history of prior queries and images selected, user online shopping history, user's most visited websites).

Identifying can include determining which features alone or in combination are likely to produce the most relevant and diverse re-ranking of the initial set of images, or are likely to produce the most relevant and diverse second set of images if a second query is performed. Identifying can also include collecting, organizing (e.g., creating a color histogram), and analyzing feature data (e.g., comparing sets of shapes or texture patterns). Feature data can include any data associated with features of the initial set of images, subset of selected images, or second set of images. In an embodiment, the optimum set of features can be identified or selected from the predefined set of features. In another embodiment, the optimum set of features can be identified or selected from the predefined set of features as well as other features.

As seen, the identifying operation 106 identifies those features predicted to be usable to obtain the most relevant and diverse ranking of the initial set of images or to obtain the most relevant and diverse second set of images. These optimum features are made available for subsequent operations in order to rank the initial set of images or perform a second query and return a second set of images.

The method 100 also includes a use features to re-rank images operation 108. The use features operation 108 entails using a set of features to re-rank the initial set of images according to a second determination of relevance to the query. The second determination is optimized to enhance relevance and diversity relative to the first determination. Using features can include accessing, gathering, and/or storing feature data from the initial set of images. Only feature data associated with features that are part of the optimum set of features are accessed, gathered, and/or stored. Using features can also mean comparing features or feature data from the initial set of images to aspects of the query. An important aspect of the present disclosure is that more than one feature can be combined into a single determination of relevance. Hence, the use features operation 108 preferably uses two or more features. For the purposes of this disclosure "optimized" does not mean the absolute best but rather means optimized relative to the first determination.

In an embodiment, the use operation 108 can re-rank the initial set of images using the optimum set of features. Re-ranking via the optimum set of features, as compared to the predefined set of features, means that the second determination of relevance provides more relevant and more diverse image search results than the first determination. In an embodiment, using the features means determining the similarity between the query and the initial set of images. Such similarity or relevance is determined by comparing the query to the features (the optimum set of features) of the initial set of images. This comparison can include converting the query and features into vectors or scalars and then determining distances between those vectors or scalars using Euclidean distance, Hamming metric, or earth movers distance. In an embodiment, linear combinations of the feature distances can be utilized.

In an embodiment where the optimum set of features is selected based on variance across the subset of selected images, the ranking of the re-ranked set of images will be based on similarities between distinguishing features rather than on similarities of non-distinguishing features. The result is a more relevant and diverse set of ranked image search results.

The final ranking, or set of ranked images, after being ranked by the use operation 108, can also be referred to as a set of re-ranked images. Although the embodiments discussed thus far have referred to a final ranking or re-ranking of the original image results, in an alternative embodiment a new query can be performed using the optimum set of features to both return a second set of images, and rank the new image search results. Hence, the final set of ranked images may include images different from those obtained in the first determination of relevance.

Using features in the second determination can use various methods or algorithms to compare features to a query. In an embodiment, the use features operation 108 can use Euclidean distance to determine the similarity between one or more features and a query. In such an embodiment, the query and the one or more features are represented as points in Euclidean n-space, where n is the number of dimensions. For instance n is two for a two-dimensional piece of paper. The value of n can also be greater than two. In an embodiment, the use features operation 108 can use a Hamming metric to determine the similarity between one or more features and a query. In such an embodiment, a feature and a query are each represented by vectors comprising one or more dimensions. The Hamming metric is a set of equations or mathematical processes that can be used to determine the similarity between one or more features and a query.

In an embodiment, the second determination of relevance uses the following equation:

$$d(a,b) = \frac{1}{n}\sum_{i=o}^{n}\frac{1}{var_i}d_i(a,b)$$

where a is a vector representing the query; b is a vector representing any image in the initial set of images; n is the number of features; i is a range of integers, each representing one of the $1^{st}$ through $n^{th}$ features; d(a,b) is a distance between vectors a and b; $d_i(a,b)$ is the distance between vectors a and b for a given feature i; and $var_i$ is the variance of feature i in the initial set of images. Greater similarity between the query and the image represented by b is found where d(a,b) is smaller. Since the variance $var_i$ is in the denominator, a larger variance equates to a smaller distance d(a,b) between the image and query, and thus greater similarity.

The method 100 also includes a return re-ranked images operation 110. The return re-ranked images operation 110 returns the re-ranked images in response to the query. By "returning images", it is meant that the images found, selected, and ranked are stored in a temporary or permanent computer readable medium accessible at a later time by the person or system that initiated the query. Alternatively, returning images means transmitting the re-ranked set of images via a network to a server or other computer system to be accessed at a later time by the person or system that initiated the query. This return operation 110 occurs in response to the query.

For the purposes of this disclosure, a "computer system" or "computing system" should be understood to refer to a system or device inclusive of a processor and memory for storing and executing program code, data and software. Memory is a form of computer readable medium including random access memory, read only memory, and dynamic random access memory, to name a few. Computing systems may be provided with operating systems that allow the execution of software applications in order to manipulate data. Computing systems can include input devices or peripherals (e.g., keyboard, mouse, joystick, microphone) and output devices or peripherals (e.g., monitors, displays, printers, speakers). Personal computers, PDAs, wireless devices, cell phones, internet appliances, media players, home theater systems, and media centers are several non-limiting examples of computing systems.

For the purposes of this disclosure, a "processor" should be understood to refer to a logic machine or component of a computing system capable of executing computer programs or instructions.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "network" includes the Internet and/or an intranet. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Important protocols in the suit can include the transmission control protocol (TCP) and the Internet protocol (IP).

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure the term "media" and "media content" should be understood to refer to binary data which contains content which can be of interest to an end user. By way of example, and not limitation, the term "media" and "media content" can refer to multimedia data, such as video data or audio data, or any other form of data capable of being transformed into a form perceivable by an end user. Such data can, furthermore, be encoded in any manner currently known, or which can be developed in the future, for specific purposes. By way of example, and not limitation, the data can be encrypted, compressed, and/or can contained embedded metadata.

For the purposes of this disclosure, a "computer readable medium" or "computer readable media" stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module can be stored on a computer readable medium. Modules can be integral to one or more servers, or be loaded and executed by one or more servers. One or more modules can grouped into an engine or an application.

Figure 2:
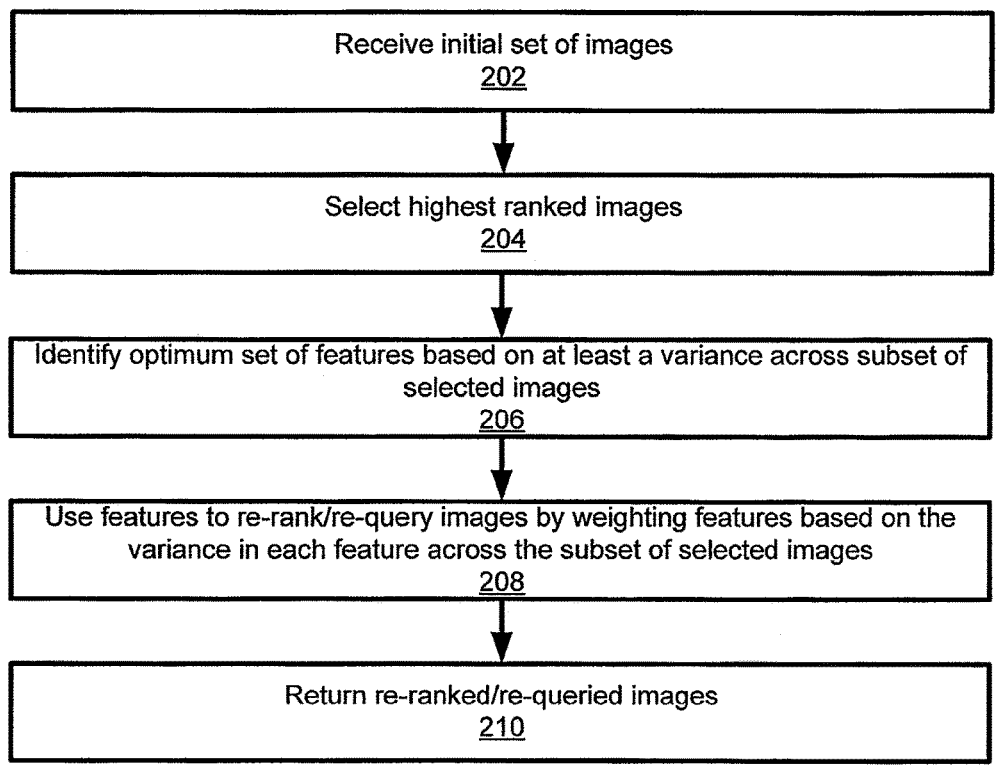
FIG. 2 illustrates an alternative embodiment of the method illustrated in FIG. 1.

FIG. 2 illustrates an alternative embodiment of the method illustrated in FIG. 1. The receive initial set of images operation 202 and the select highest ranked images operation 204 are analogous to the receive operation 102 and select operation 104 of FIG. 1. However, the method 200 also includes an identify features operation 206 that differs slightly from the identify features operation 106 of FIG. 1. Like the identify features operation 106, the identify features operation 206 identifies features based on characteristics of the subset of images. However, the difference is that the identify features operation 206 identifies features based on at least a variance across the subset of selected images. In other words, a variance across the subset of selected images can be a characteristic of the subset. Put another way, the characteristics of the identify features operation 106 can encompass determining which features have the greatest variance. As discussed earlier, this comprises using a predefined set of features and analyzing a subset of the images and determining the variance of each feature across the subset of the images.

The degree/amount of variance for each feature can be used to rank the features. Those features having the greatest variance are selected for or become part of the optimum set of features. In an alternative embodiment, the optimum set of features comprises those features having the lowest variance across the subset of selected images. An optimum set of features having greater variance (the first above-noted embodiment) leads to greater diversity while an optimum set of features having less variance (the second above-noted embodiment) leads to more focused search results.

The method 200 can also include a use features operation 208 entailing using features to re-rank images in order to enhance relevance and diversity. The use features operation 208 is an alternative embodiment of the use features operation 108 of FIG. 1. Recall that the use features operation 108 re-ranks the initial set of images based on the optimum set of features, and each feature in the optimum set is utilized equally—applied with equal weight or importance. However, even within the optimum set of features there are some features that are more important (are more likely to produce relevant and diverse image search results) than others. Thus, an alternative embodiment to the use features operation 108 is the use features operation 208 in which features are weighted based on the variance for each feature across the subset of selected images. For instance, color, texture, and shape may be selected in the identify optimum set of features operations 106, 206. Yet, for a given query, color may be a more important feature (provides more relevant and diverse search results and rankings) than texture. As such, when the images are re-ranked using the optimum set of features, the ranking will be more influenced by similarity in the color feature—the color feature will have a greater weight or weighting. In an embodiment, weight or weighting of features in a linear combination can depend on the variance for those features across the subset of selected images.

The method 200 also includes a return operation 210 which is identical to the return operation 110 illustrated in FIG. 1 and discussed with reference to the method 100.

Figure 3:
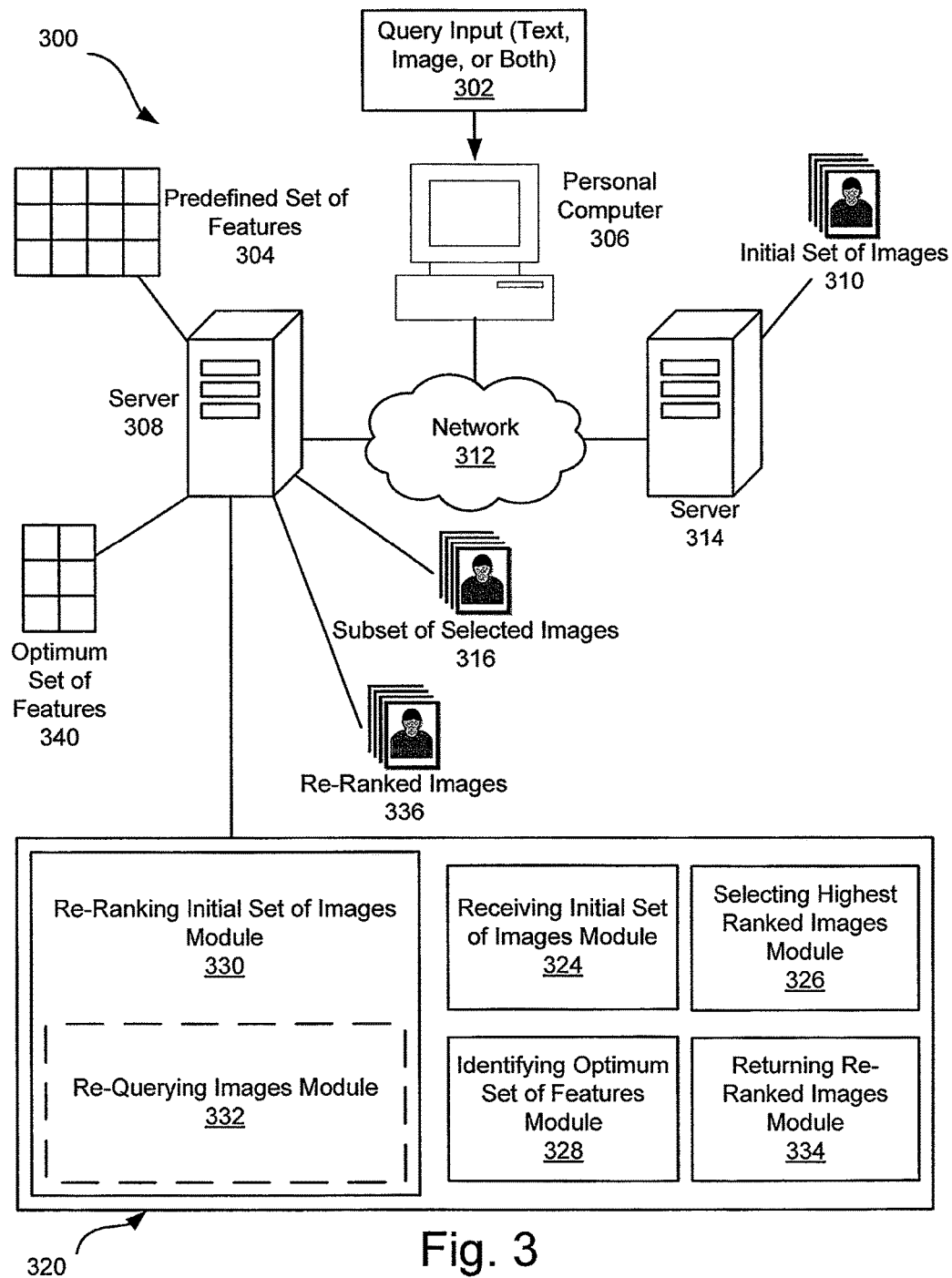
FIG. 3 illustrates an embodiment of a system for re-ranking or re-querying image search results using an optimum set of features.

FIG. 3 illustrates an embodiment of a system for re-ranking or re-querying image search results using an optimum set of features. The system 300 includes a query input 302. In an embodiment, the query input 302 can be text entered into a text box or other user interface that accepts textual inputs. In another embodiment, a textual query can be based on voice recognition. Alternatively, the query input 302 can be entered via optical character recognition of a scanned document or a digital document. In an alternative embodiment, the query input 302 is an image. In an alternative embodiment, the query input 302 is a combination of textual and image input. These various query inputs can be entered into or received by a computing system such as personal computer 306.

The system 300 also includes a predefined set of features 304. The predefined set of features can include features such as color, edge, texture, and shape, to name a few. The predefined set of features can be stored on a computer readable medium residing in a computing system such as a server 308 or personal computer 306.

The predefined set of features 304 can be used to select an initial set of images 310 accessible via a network 312 and selected based on relevance to the query 302. The initial set of images 310 can be stored on a computer readable medium residing in a computing system such as a server or series of servers 314. The initial set of images 310 are those images deemed to be most relevant to a query derived from the query input 302.

The system 300 also includes an image matching module 320. The image matching module 320 is responsible for selecting an optimum set of features 340 based on the initial set of images 310 and then re-ranking the initial set of images 310 using the optimum set of features 340. The optimum set of features 340 can be selected from the predefined set of features 304. The optimum set of features 340 can also be selected from the predefined set of features 304 as well as other features.

The image matching module 320 includes a receiving initial set of images module 324. The receiving module 324 receives the initial set of images 310. In an embodiment, the receiving module 324 can also store the initial set of images 310 on a temporary or permanent computer readable medium residing on a server, such as server 308, or another server in communication with server 308. In an embodiment, only an index or address to the location of the images in the initial set of images 310 is received by the receiving module 324. In such a case, no copies of the images in the initial set of images 310 are made yet. Instead the images remain stored on their original servers, but can be accessed or copied by the modules discussed below.

The image matching module 320 includes a selecting highest ranked images module 326 that selects a plurality of the highest ranked images from the initial set of images 310 to form a subset of selected images 316. Like the initial set of images 310, the subset of selected images 316 can be stored on a temporary or permanent computer readable medium residing on the server 308 or another server in communication with server 308.

The image matching module 320 also includes an identifying optimum set of features module 328. This identifying module 328 identifies those features in the predefined set of features 304 that, when used to re-rank the initial set of images 310, will produce the most relevant and diverse image search results. In an embodiment, the identifying module 328 identifies the features to be in the optimum set of features 340 by analyzing the variance for each feature across the subset of selected images 316. Those features having the greatest variance are identified for use as members of the optimum set of features 340. In an embodiment, those features having the least variance across the subset of selected images 316 are identified for use as members of the optimum set of features 340.

The image matching module 320 also includes a re-ranking initial set of images module 330. The re-ranking module 330 re-ranks the initial set of images 310 to form re-ranked images 336. This is done by using the optimum set of features 340 to determine the relevance of each image in the initial set of images 310. The re-ranking module 330 also re-ranks the initial set of images 310 based on the relevance of each image to the query 302. In this way diversity is also improved over those image search results derived via traditional methods.

In an embodiment, the re-ranking initial set of images module 330 includes a re-querying images module 332. The re-querying images module 332 performs a new or second query searching for images based on similarity or relevance to the query 302 as determined by analyzing potential images using the optimum set of features 340. Subsequent to the second query, the image re-ranking module 330 can re-rank image search results from the second query. In this fashion, not only will the image search results in general be more relevant and diverse than the initial set of images 310, but the image search results will also be more effectively ranked in order to maximize relevance and diversity.

The image matching module 320 also includes a returning re-ranked images module 334. The returning re-ranked images module 334 transmits the re-ranked images 336 to a server or computing system where the query originated or to a server or computing system associated with the source of the query. In an embodiment, only links to the re-ranked images 336 are transmitted to or provided to the source of the query.

Those skilled in the art will recognize that the embodiment illustrated in FIG. 3 is only one configuration of a system capable of carrying out the methods of the present disclosure. As such, other arrangements of the illustrated embodiment including more, less, alternative components or alternative configurations of components may also be implemented.

Those skilled in the art will recognize that the systems and methods of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either a client or server or both. In this regard, any number of the features of the different embodiments described herein can be combined into single or multiple embodiments, and alternate embodiments having fewer than, or more than, all of the features described herein are possible. Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure. For instance, the systems and methods described above can be utilized to search for and rank documents other than images (e.g., text-based documents, text/image-based documents, interactive documents, videos, text/image/video-based documents).

Additionally, other forms of querying can be utilized. For example, a user can run an initial text-based query, select one or more images from the results, and then re-run the query based on those images. This represents an alternative way to initiate an image-based query. Alternatively, a user can select features from a set of image results and then re-run the query based upon user-selected features. In an alternative embodiment, a query can be text and image based. For instance, a text box may be used to insert textual queries while at the same time other selection means could be used to select images. The query would then utilize both the textual and image queries to determine a set of search results. Additionally, the systems and methods herein described can utilize textual matching as well as the image analysis systems and methods described above.

Numerous other changes can be made that will readily suggest themselves to those skilled in the art and which are encompassed in the spirit of the invention disclosed and as defined in the appended claims.

What is claimed is:
1. A method comprising the steps of:
receiving, by a processor, an initial set of images related to a query via a network, the initial set of images obtained from a first ranking that is based on a first determination of relevance to the query;

selecting, by the processor, a plurality of highest ranked images from the initial set of images to form a subset of selected images;
receiving, by the processor, a set of features from the images of the subset based on characteristics of the images of the subset, the characteristics comprising at least a variance for each feature of the set of features across the subset of selected images;
analyzing, by the processor, variance for each feature of the set of features across the subset of selected images;
identifying, by the processor, features of the plurality of highest ranked images in the image subset having greater values of variance relative to other features in the set of features so as to distinguish features from the feature set;
creating, by the processor, a second determination of relevance to the query providing more relevant and more diverse image search results than the first determination, the creating comprising including the identified features having greater values of variance into an optimum subset of features, the second determination of relevance for each image to the query being determined via weighting each feature of the optimum subset of features based on the variance for each feature and performing a summation of the weighted features;
performing, by the processor, a second ranking of the initial set of images from the first ranking by using the optimum subset of features according to the second determination of relevance to the query such that the images from the second ranking are more relevant to the query, and more diverse, than the subset of selected images from the first ranking; and
returning, by the processor, the images from the second ranking in response to the query.

2. The method of claim 1, wherein greater weight is assigned to features having greater variance.

3. The method of claim 1, wherein the images are ranked based on a first determination of diversity.

4. The method of claim 1, wherein the second relevance of each image to the query is determined via the following equation:

$$d(a,b) = \frac{1}{n}\sum_{i=o}^{n}\frac{1}{var_i}d_i(a,b)$$

where a is a vector representing the query;
where b is a vector representing any image in the subset of selected images;
where n is the number of features;
where i is a range of integers, each representing one of the $1^{st}$ through $n^{th}$ features;
where d(a,b) is a distance between vectors a and b;
where $d_i(a,b)$ is the distance between vectors a and b for a given feature i; and
where $var_i$ is the variance of feature i in the subset of selected images.

5. The method of claim 1, wherein the query is text.

6. The method of claim 1, wherein the query is an image.

7. The method of claim 1, wherein re-ranking the set of images includes performing a second query using the optimum subset of features.

8. The method of claim 1, wherein features include at least one or more of the following: a color layout, a color histogram, scalable color, an edge histogram, an edge directivity descriptor, and tamura.

9. The method of claim 1, wherein features include non-visual features.

10. The method of claim 9, wherein non-visual features are extracted from text associated with an image, image metadata, image spatial information, query spatial information, image temporal information, query temporal information, social characteristics associated with the image or the user, or a user profile.

11. A non-transitory computer readable storage medium tangibly comprising computer readable instructions for:
receiving an initial set of images related to a query via a network, the initial set of images obtained from a first ranking that is based on a first determination of relevance to the query;
selecting a plurality of highest ranked images from the initial set of images to form a subset of selected images;
receiving a set of features from the images of the subset based on characteristics of the images of the subset, the characteristics comprising at least a variance for each feature of the set of features across the images of the subset;
analyzing variance for each feature of the set of features across the subset of selected images;
identifying features of the plurality of highest ranked images in the image subset having greater values of variance relative to other features in the set of features so as to distinguish features from the feature set;
creating a second determination of relevance to the query providing more relevant and more diverse image search results than the first determination, the creating comprising including the identified features having greater values of variance into an optimum subset of features, the second determination of relevance for each image to the query being determined via weighting each feature of the optimum subset of features based on the variance for each feature and performing a summation of the weighted features;
performing a second ranking of the initial set of images from the first ranking by using the optimum subset of features according to the second determination of relevance to the query such that the images from the second ranking are more relevant to the query, and more diverse, than the subset of selected images from the first ranking; and
returning the images from the second ranking in response to the query.

12. A system comprising:
a processor; and
a non-transitory computer readable storage medium storing thereon program logic for execution by the processor, the program logic comprising:
receiving logic executed by the processor for receiving an initial set of images selected for its relevance to a query input from a first ranking that is based on a first determination comprising a predefined set of image features;
selection logic executed by the processor for selecting a plurality of the highest ranked images from the initial set of images to form a subset of selected images;
identification logic executed by the processor for analyzing variance for each feature of the predefined set of image features across the subset of selected images for identifying those image features of the plurality of highest ranked images in the image subset having greater values of variance relative to other features in the set of features so as to distinguish features from the feature set;

creation logic executed by the processor for creating a second determination of relevance to the query providing more relevant and more diverse image search results than the first determination, the creating comprising including the identified features having greater values of variance into an optimum subset of features, the second determination of relevance for each image to the query being determined via weighting each feature of the optimum subset of features based on the variance for each feature and performing a summation of the weighted features;

determination logic executed by the processor for determining a second ranking of the initial set of images from the first ranking by using the optimum subset of features according to the second determination of relevance to the query such that the images from the second ranking are more relevant to a query input, and more diverse, than the subset of selected images from the first ranking; and communication logic executed by the processor for returning the images from the second ranking.

13. The system of claim 12 further comprising:

query logic executed by the processor for performing a second query for image search results based on the optimum subset of features.

* * * * *